(12) United States Patent
Bunker et al.

(10) Patent No.: US 11,313,235 B2
(45) Date of Patent: Apr. 26, 2022

(54) ENGINE COMPONENT WITH FILM HOLE

(71) Applicant: General Electric Company, Schenectady, NY (US)

(72) Inventors: Ronald Scott Bunker, West Chester, OH (US); Frederick Alan Buck, Sharonville, OH (US); Robert David Briggs, West Chester, OH (US); Gulcharan Singh Brainch, West Chester, OH (US); Kevin Robert Feldmann, Mason, OH (US)

(73) Assignee: General Electric Company

( * ) Notice: Subject to any disclaimer, the term of this patent is extended or adjusted under 35 U.S.C. 154(b) by 993 days.

(21) Appl. No.: 14/659,640

(22) Filed: Mar. 17, 2015

(65) Prior Publication Data
US 2016/0273363 A1 Sep. 22, 2016

(51) Int. Cl.
*F01D 5/18* (2006.01)
*F01D 9/06* (2006.01)
*F23R 3/00* (2006.01)

(52) U.S. Cl.
CPC ............. *F01D 5/186* (2013.01); *F01D 5/187* (2013.01); *F01D 9/065* (2013.01); *F23R 3/002* (2013.01); *F23R 2900/03042* (2013.01); *Y02T 50/60* (2013.01)

(58) Field of Classification Search
CPC ............................ F01D 5/186; F05D 2260/202
See application file for complete search history.

(56) References Cited

U.S. PATENT DOCUMENTS

| 5,382,133 | A | 1/1995 | Moore et al. | |
| 5,688,104 | A | 11/1997 | Beabout | |
| 8,057,182 | B2* | 11/2011 | Brittingham | F01D 5/186 415/115 |
| 8,066,484 | B1* | 11/2011 | Liang | F01D 5/186 415/115 |
| 8,572,983 | B2* | 11/2013 | Xu | F23R 3/06 60/752 |
| 8,850,828 | B2* | 10/2014 | Mongillo, Jr. | F01D 5/186 415/115 |
| 9,945,233 | B2* | 4/2018 | Tanaka | B23H 9/10 |
| 10,386,069 | B2* | 8/2019 | Pearson | F01D 5/186 |
| 2010/0040459 | A1 | 2/2010 | Ohkita | |

(Continued)

FOREIGN PATENT DOCUMENTS

| CA | 2 282 010 A1 | 3/2000 |
| CA | 2 912 828 A1 | 11/2014 |

(Continued)

OTHER PUBLICATIONS

European Search Report and Opinion issued in connection with corresponding EP Application No. 16160461.6 dated Jul. 15, 2016.

(Continued)

*Primary Examiner* — Richard A Edgar
*Assistant Examiner* — John S Hunter, Jr.
(74) *Attorney, Agent, or Firm* — McGarry Bair PC

(57) ABSTRACT

An engine component for a gas turbine engine includes a film-cooled substrate having a hot surface facing hot combustion gas and a cooling surface facing a cooling fluid flow. The substrate includes one or more film holes that have a metering section defining a metering diameter and a diffusing section that defines a hooded length.

20 Claims, 6 Drawing Sheets

(56) References Cited

U.S. PATENT DOCUMENTS

| | | | |
|---|---|---|---|
| 2010/0068033 A1 | 3/2010 | Liang | |
| 2010/0068067 A1 | 3/2010 | Liang | |
| 2013/0205791 A1* | 8/2013 | Mongillo, Jr. | F01D 5/186 |
| | | | 60/754 |
| 2013/0209229 A1 | 8/2013 | Xu et al. | |
| 2014/0099189 A1 | 4/2014 | Morris et al. | |
| 2014/0119944 A1 | 5/2014 | Xu et al. | |
| 2016/0201469 A1* | 7/2016 | Lewis | F01D 5/081 |
| | | | 415/115 |

FOREIGN PATENT DOCUMENTS

| | | |
|---|---|---|
| CA | 2912828 A1 | 11/2014 |
| CN | 104364581 A | 2/2015 |
| EP | 2799775 A2 | 11/2014 |
| JP | 2000-087701 A | 3/2000 |
| JP | 2008-121561 A | 5/2008 |
| JP | 2011-196360 A | 10/2011 |
| JP | 2013-100771 A | 5/2013 |
| JP | 2014-227914 A | 12/2014 |
| WO | 20130188645 A2 | 12/2013 |

OTHER PUBLICATIONS

Machine translation and Notification of Reasons for Refusal issued in connection with corresponding JP Application No. 2016-049070 dated Mar. 7, 2017.

First Office Action and Search issued in connection with corresponding CN Application No. 201610151920.2 dated Mar. 17, 2017.

\* cited by examiner

ENGINE COMPONENT WITH FILM HOLE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, may be necessary. Some engine components include film holes that supply a thin layer or film of cooling fluid on a hot surface of the engine component to protect the engine component from hot combustion gas.

BRIEF DESCRIPTION OF THE INVENTION

Embodiments of the invention relate broadly to film-cooled engine components, particularly in a gas turbine engine.

In one aspect, the invention relates to an engine component for a gas turbine engine, the gas turbine engine generating hot combustion gas flow, having a substrate having a hot surface facing the hot combustion gas flow and a cooling surface facing a cooling fluid flow, the hot combustion gas generally defining an upstream direction and a downstream direction relative to the hot surface, and a film hole extending through the substrate and defining a centerline. The film hole includes a metering section defining a metering diameter D and a diffusing section having a downstream boundary surface and an upstream boundary surface, wherein the diffusing section defines a hooded length L as the distance along the upstream boundary surface between a downstream end of the metering section and the hot surface, and wherein $1 \leq L/D \leq 6$.

In another aspect, the invention relates to an engine component for a gas turbine engine, the gas turbine engine generating hot combustion gas flow, having a substrate having a hot surface facing the hot combustion gas flow and a cooling surface facing a cooling fluid flow, the hot combustion gas flow generally defining an upstream direction and a downstream direction relative to the hot surface, and a film hole extending through the substrate and defining a centerline. The film hole includes a metering section having an inlet provided on the cooling surface defining a metering diameter D and a diffusing section having a downstream boundary surface, an upstream boundary surface, and an outlet provided on the hot surface, wherein the diffusing section defines a hooded length L as the distance along the upstream boundary surface between a downstream end of the metering section and the outlet provided on the hot surface and wherein the ratio of the hooded length L to the metering diameter D is approximately equal to the blowing ratio of the film hole.

DESCRIPTION OF EMBODIMENTS OF THE INVENTION

The described embodiments of the present invention are directed to a film-cooled engine component, particularly in a gas turbine engine. For purposes of illustration, aspects of the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
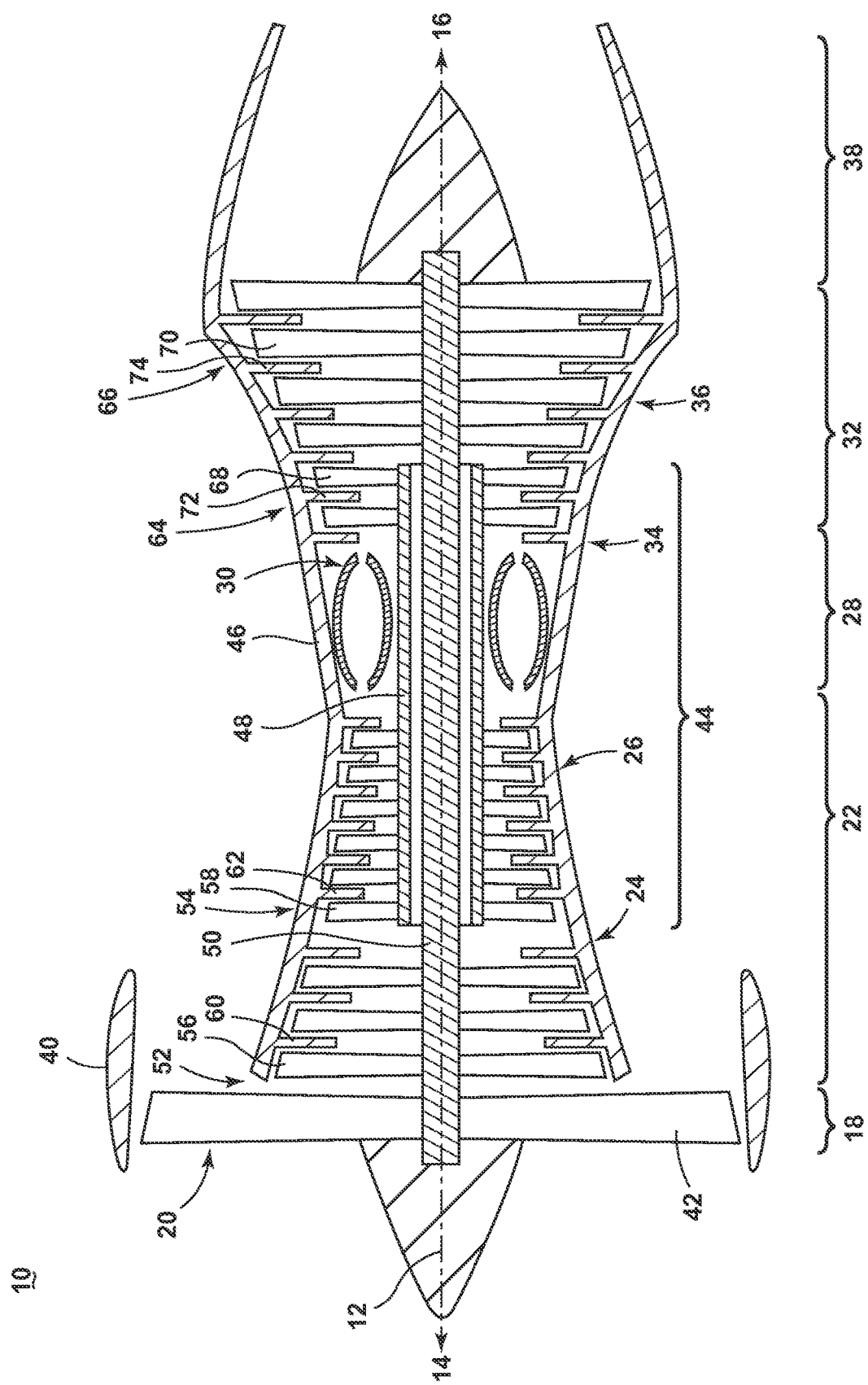
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by a core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
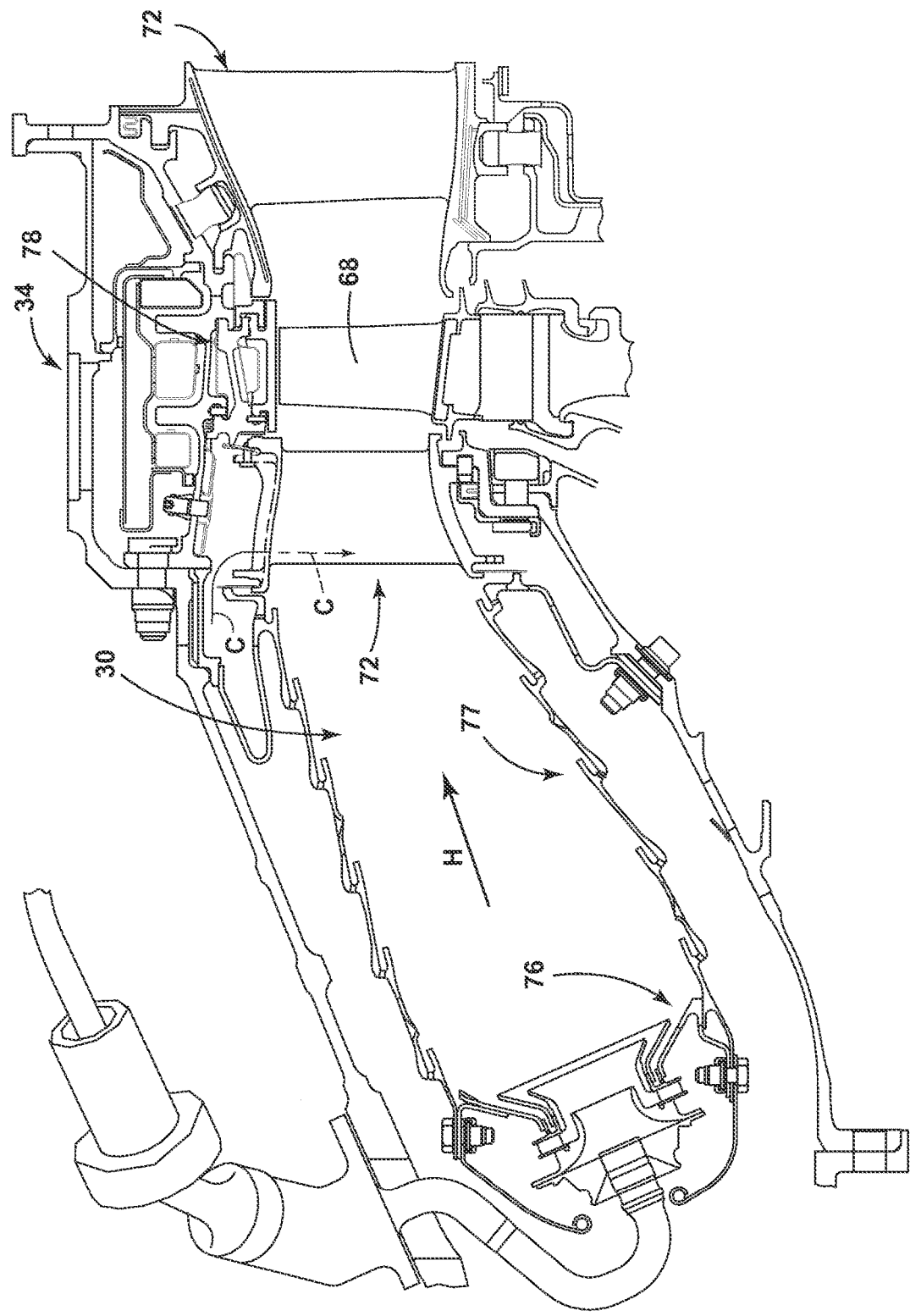
FIG. 2 is a side section view of a combustor and high pressure turbine of the engine from FIG. 1.

FIG. 2 is a side section view of the combustor 30 and HP turbine 34 of the engine 10 from FIG. 1. The combustor 30 includes a deflector 76 and a combustor liner 77. Adjacent to the turbine blade 68 of the turbine 34 in the axial direction are sets of radially-spaced, static turbine vanes 72, with adjacent vanes 72 forming nozzles therebetween. The nozzles turn combustion gas to better flow into the rotating blades so that the maximum energy may be extracted by the turbine 34. A cooling fluid flow C passes through the vanes 72 to cool the vanes 72 as hot combustion gas flow H passes along the exterior of the vanes 72. A shroud assembly 78 is adjacent to the rotating blade 68 to minimize flow loss in the turbine 34. Similar shroud assemblies can also be associated with the LP turbine 36, the LP compressor 24, or the HP compressor 26.

One or more of the engine components of the engine 10 includes a film-cooled substrate in which a film hole of an embodiment disclosed further herein may be provided. Some non-limiting examples of the engine component having a film-cooled substrate can include the blades 68, 70, vanes or nozzles 72, 74, combustor deflector 76, combustor liner 77, or shroud assembly 78, described in FIGS. 1-2. Other non-limiting examples where film cooling is used include turbine transition ducts and exhaust nozzles.

Figure 3:
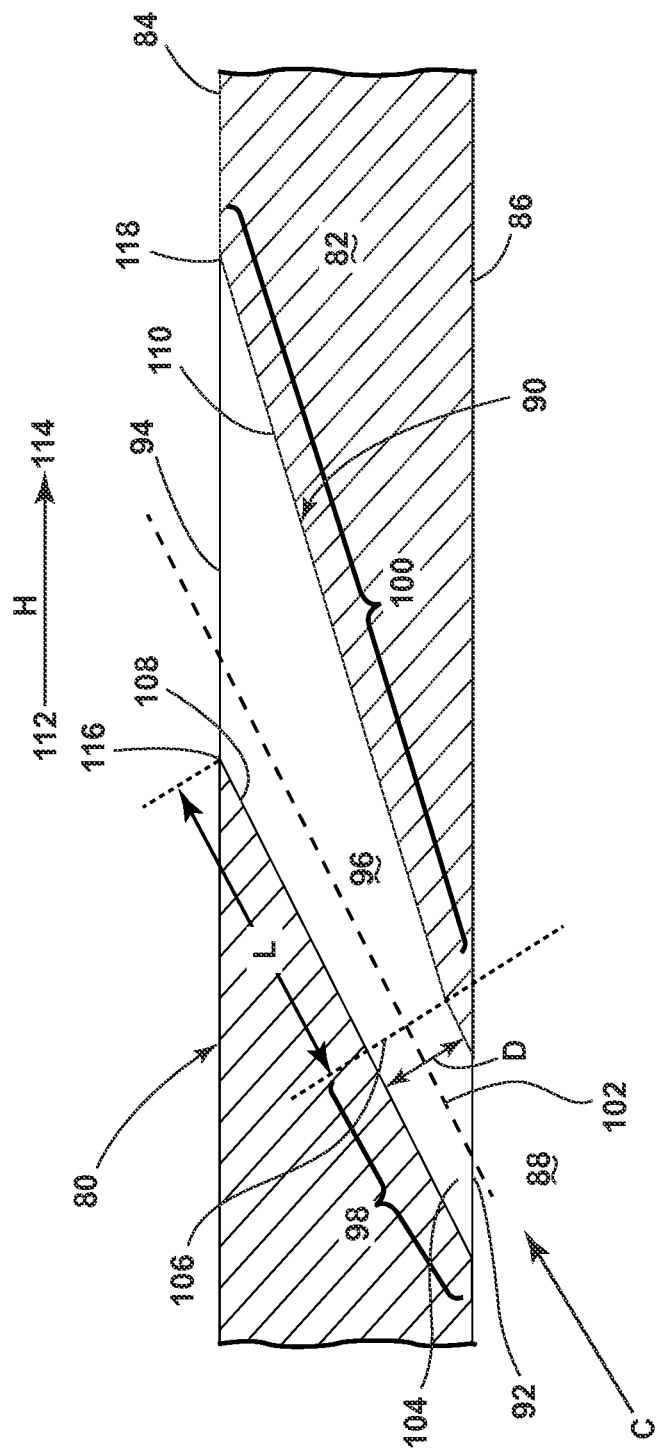
FIG. 3 is a schematic, sectional view through a film hole of an engine component of the engine from FIG. 1 according to a first embodiment of the invention.

FIG. 3 is a schematic, sectional view showing a portion of an engine component 80 according to a first embodiment of the invention. The engine component 80 may be an engine component of the engine 10 from FIG. 1, and can be disposed in a flow of hot gas represented by arrow H. A cooling fluid flow, represented by arrow C may be supplied to cool the engine component. As discussed above with respect to FIGS. 1-2, in the context of a turbine engine, the cooling air can be ambient air supplied by the fan 20 which bypasses the engine core 44, fluid from the LP compressor 24, or fluid from the HP compressor 26.

The engine component 80 includes a substrate 82 having a hot surface 84 facing the hot combustion gas flow H and a cooling surface 86 facing the cooling fluid C. The substrate 82 may form a wall of the engine component 80; the wall may be an exterior or interior wall of the engine component 80. The first engine component 80 can define at least one interior cavity 88 comprising the cooling surface 86. The hot surface 84 may be an exterior surface of the engine component 80. In the case of a gas turbine engine, the hot surface 84 may be exposed to gases having temperatures in the range of 1000° C. to 2000° C. Suitable materials for the substrate 82 include, but are not limited to, steel, refractory metals such as titanium, or superalloys based on nickel, cobalt, or iron, and ceramic matrix composites. The superalloys can include those in equi-axed, directionally solidified, and single crystal structures.

The engine component 80 further includes one or more film hole(s) 90 extending through the substrate 82 that provide fluid communication between the interior cavity 88 and the hot surface 84 of the engine component 80. During operation, the cooling fluid flow C is supplied to the interior cavity 88 and out of the film hole 90 to create a thin layer or film of cool air on the hot surface 84, protecting it from the hot combustion gas flow H. While only one film hole 90 is shown in FIG. 3, it is understood that the engine component 80 may be provided with multiple film holes 90.

The film hole 90 can have an inlet 92 provided on the cooling surface 86 of the substrate 82, an outlet 94 provided on the hot surface 84, and a passage 96 connecting the inlet 92 and the outlet 94. The passage 96 can include a metering section 98 for metering of the mass flow rate of the cooling fluid flow C, and a diffusing section 100 in which the cooling fluid C may expand to form a wider cooling film. The diffusing section 100 is downstream of the metering section 98 with respect to the direction of the cooling fluid flow C through the passage 96. The diffusing section 100 may be in serial flow communication with the metering section 98. The metering section 98 can be provided at or near the inlet 92, while the diffusing section 100 can be defined at or near the outlet 94. In operation, cooling fluid flow C enters the film hole 90 through the inlet 92 and passes through the metering section 98 and diffusing section 100 before exiting the film hole 90 at the outlet 94 along the hot surface 84.

The metering section 98 is a portion of the passage 96 with the smallest cross-sectional area perpendicular to the direction of the cooling fluid flow C through the passage 96. The metering section 98 may be a discrete location at which the passage has the smallest cross-sectional area, or an elongated section of the passage 96. The cross-sectional area of the metering section 98 defines a metering diameter D of the passage 96.

It is noted that the term "metering diameter D" as used with respect to the metering section 98 of this or any other embodiments of the invention is not meant to limit the metering section 98 to any particular cross-section, where the cross-section of the metering section 98 is determined perpendicular to the direction of the cooling fluid flow C through the passage 96. In this embodiment, the metering section 98 is generally circular in cross-section. However the specific cross-sectional shape of the metering section 98 may differ for other embodiment of the invention; for example, the cross-sectional shape of the metering section 98 may be rectangular or elliptical. For non-circular metering sections 98, the metering diameter D may be the hydraulic diameter of the cross-section, which is defined commonly as four times the cross-sectional area divided by the cross-sectional perimeter. For very irregular metering sections 98 that still are generally circular, such as those commonly produced by percussion laser machining, the metering diameter D may be the diameter of the largest circular pin that can be passed through the metering section 98 without damage. For non-circular sections that also have irregular surfaces, the metering diameter D may be the hydraulic diameter of the appropriately shaped largest pin that can be passed through without damage. For non-straight or non-constant cross section lengths prior to the diffusion section 100, the same overall definitions may be used at the minimum cross sectional area location.

The cooling fluid flow C through the passage 96 is along the longitudinal axis of the passage 96, also referred to herein as the centerline 102, which passes through the geometric center of the cross-sectional area of the metering section 98. The film hole 90 can be inclined in a downstream direction of the cooling fluid flow C through the passage 96 such that the centerline 102 is non-orthogonal to the hot and cooling surfaces 84, 86. As used herein with respect to the film hole 90, the term "axial direction" and variants thereof refer to the direction of cooling fluid flow C along the centerline 102 from the cooling surface 86 to the hot surface 84.

An inlet 104 to the metering section 98 communicates with the inlet 92 to the passage 96 and receives the cooling fluid flow C therefrom. An outlet of the diffusing section 100 is coincident with the outlet 94 of the passage 96. In some embodiments of the invention, including the embodiment of FIG. 3, the inlet 104 to the metering section 98 may further be coincident with the inlet 92 to the passage 96.

An outlet of the metering section 98 is coincident with an inlet to the diffusing section 100, and the coincident outlet and inlet define a transition 106 between the metering section 98 and the diffusing section 100 where the cooling fluid flow C may begin to expand. In the illustrated embodiment, the metering section 98 is an elongated section of the passage 96, and the transition 106 lies at a distal or downstream end of the metering section 98. The transition 106 is defined by an imaginary line that is perpendicular to the centerline 102 at the outlet or downstream end of the metering section 98. In embodiments where the metering section 98 is a discrete location at which the passage 96 has the smallest cross-sectional area, the upstream and downstream ends of the metering section 98 may be coincident, such that the transition 106 and the downstream end of the metering section 98 may be one and the same. It is noted that while the transition 106 is shown as a line, it is understand that the transition 106 does not have to lie within a plane. In other cases, there may be more gradual transition between the metering section 98 and the diffusing section 100 that does not lie within a planar section of the passage 96.

The diffusing section 100 includes a pair of spaced apart boundary surfaces 108, 110. The boundary surfaces 108, 110 can generally be defined relative to the direction of the hot combustion gas flow H, with the hot combustion gas flow H generally defining an upstream direction 112 and a downstream direction 114 relative to the hot surface 84, i.e. past the outlet 94. The upstream boundary surface 108 generally faces the downstream direction 114 and the downstream boundary surface 110 generally faces the upstream direction 112. The upstream boundary surface 108 intersects the hot surface 84 of the substrate 82 at an upstream edge 116 of the outlet 94, and the downstream boundary surface 110 intersects the hot surface 84 of the substrate 82 at a downstream edge 118 of the outlet 94.

The upstream and downstream boundary surfaces 108, 110 may be substantially parallel to, diverge from, or converge towards the centerline 102 in the axial direction. In the illustrated embodiment, the upstream boundary surface 108 is substantially parallel to the centerline 102 while the downstream boundary surface 110 diverges away from the centerline 102. Further, the upstream and downstream boundary surfaces 108, 110, when viewed in cross-section as in FIG. 3, can define linear or curved boundary lines for the diffusing section 100. A curved boundary line can curve toward or away from the centerline 102. In the illustrated embodiment, both the upstream and downstream boundary surfaces 108, 110 define linear boundary lines.

The diffusing section 100 defines a hooded length L that generally corresponds to the amount of cover provided by the upstream boundary surface 108 to the cooling fluid flow C. A longer hooded length L means that the cooling fluid flow C may diffuse for a longer distance before being exposed to the hot combustion gas flow H. The hooded length L is different than the diffusing length of the film hole in that it is more indicative of cooling fluid flow diffusion than the overall length of the diffusing section 100, since the hot combustion gas flow H may begin to interact with the cooling fluid flow C as soon as the hot combustion gas flow H reaches the upstream edge 116 of the outlet 94. For film holes such as the illustrated example in which the metering section 98 extends from the inlet 92 to the diffusion section 100, the overall length of the diffusing section 100 is simply the difference between the length of the metering section 98 and the total film hole length between the inlet 92 and the outlet 94, along the centerline 102.

The hooded length L can be defined as the distance along the upstream boundary surface 108 between the downstream end of the metering section 98, or the transition 106, and the hot surface 84. In the illustrated embodiment, the hooded length L is determined between the transition 106 and the upstream edge 116 along the linear upstream boundary surface 108.

The hood ratio L/D of the film hole 90 is the ratio of the hooded length L of the diffusing section 100 to the metering diameter D. The hood ratio L/D is an indication of the film cooling effectiveness of the film hole 90. For example, if a film hole 90 has a hooded length L that is too small relative to the metering diameter D (i.e. a small hood ratio L/D), a large volume of cooling fluid flow C may flow through the film hole 90 without sufficiently diffusing. Likewise, if a film hole 90 has a hooded length L that is too large relative to the metering diameter D (i.e. a large hood ratio L/D), the cooling fluid flow C may remain within the substrate 82 of the engine component 80 long enough to become heated prior to forming the film on the hot surface 84.

The hood ratio L/D may vary depending on the flow parameters for the film hole 90. In one example, the hood ratio L/D may be based on the blowing ratio BR, which is the ratio of the momentum of the cooling fluid flow exiting the outlet 94 of the film hole 90 to the momentum of the hot combustion gas flow H local to the outlet 94 of the film hole 90. By "local", the momentum is measured as the freestream hot combustion gas flow H just approaches the outlet 94. The blowing ratio BR is defined as follows:

$$BR = (\rho \times V)\text{coolant} / (\rho \times V)\text{hot gas}$$

where:
ρ=the fluid density
V=the local bulk fluid velocity.

The hood ratio L/D preferably increases with the blowing ratio BR such that the hood ratio L/D is approximately equal to the blowing ratio BR; this allows for the cooling fluid flow C to diffuse under cover of the upstream boundary surface 108 of the diffusing section 100 prior to its first interaction with the hot combustion gas flow H. If the hood ratio L/D is too small relative to the blowing ratio BR, then the cooling fluid flow C will not diffuse or spread enough, and a core portion of the cooling fluid flow C will interact with the hot combustion gas flow H, leading to undesirable mixing and loss of film cooling effectiveness. If the hood ratio L/D is too large relative to the blowing ratio BR, the cooling fluid flow C will be excessively heated within the film hole 90, which also decreases the film cooling effectiveness. By way of example, the film hole 90 can have a hood ratio L/D value corresponding to a range of blowing ratios BR given in Table 1 below.

TABLE 1

Exemplary Hood Ratio based on Blowing Ratio

| Blowing Ratio BR | Hood Ratio L/D |
|---|---|
| 0 to 2 | 1 |
| 0.5 to 3 | 2 |
| 1.5 to 4 | 3 |
| 2.5 to 5 | 4 |
| 3.5 to 6 | 5 |
| 4.5 to 10 | 6 |

Thus, the hood ratio L/D preferably falls within the following range:

$$1 \leq L/D \leq 6$$

Typical values for the blowing ratio BR for a gas turbine engine range from 0.5 to 5. So, for a gas turbine engine the hood ratio L/D may more specifically be:

$$2 \leq L/D \leq 4$$

Figure 4:
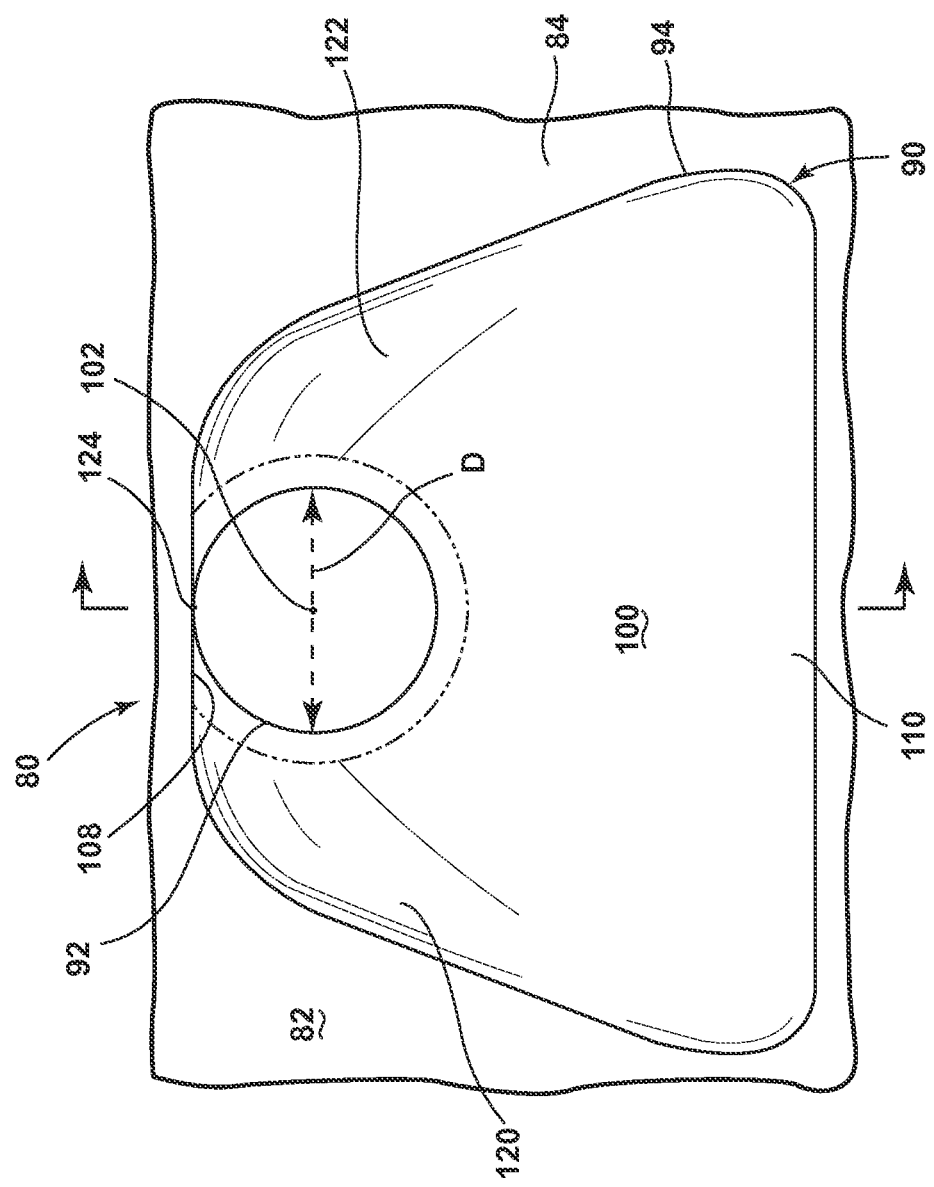
FIG. 4 is a plan view of the hot surface of the engine component from FIG. 3.

FIG. 4 is a top view of the hot surface 84 of the engine component 80 from FIG. 3 looking along the centerline 102 of the film hole 90. As shown in FIG. 4, the upstream and downstream boundary surfaces 108, 110 of the diffusing section 100 lie on opposing sides of the centerline 102 and are substantially planar. The diffusing section 100 further includes opposing side surfaces 120, 122, also substantially planar, that extend between the boundary surfaces 108, 110. Like the downstream boundary surface 110, one or both of the side surfaces 120, 122 may diverge away from the centerline 102. The side surfaces 120, 122 may blend with the boundary surfaces 108, 110 as smooth curves rather than a sharp corner or fillet. Alternatively, one or both of the upstream and downstream surfaces 108, 110 may curve around the centerline 102 and meet either each other or an intermediate side surface.

The diffusing section 100 may have a circular cross-section or a non-circular cross-section, such as, but not limited to, a rectangular, elliptical, or trapezoidal cross-section. The overall shape of the diffusing section 100 shown in FIG. 4 is substantially similar to an oblique pyramid, such that, in the axial direction, the diffusing section 100 generally diverges from the centerline 102 but has a substantially trapezoidal cross-section. Alternatively, the overall shape of the diffusing section 100 may be conical, with a substantially circular cross-section.

For the film hole 90 illustrated, in which the diffusing section 100 is substantially axisymmetric about the centerline 102, the hooded length L is defined along the midline 124 of the upstream boundary surface 108. In the illustrated view, since the upstream boundary surface 108 is parallel to the centerline 102, the midline 124 is shown as a point. For a film hole having an asymmetric diffusing section shape, the hooded length L can be defined as the minimum length between the transition 106 and the hot surface 84 along the upstream boundary surface 108.

Figure 5:
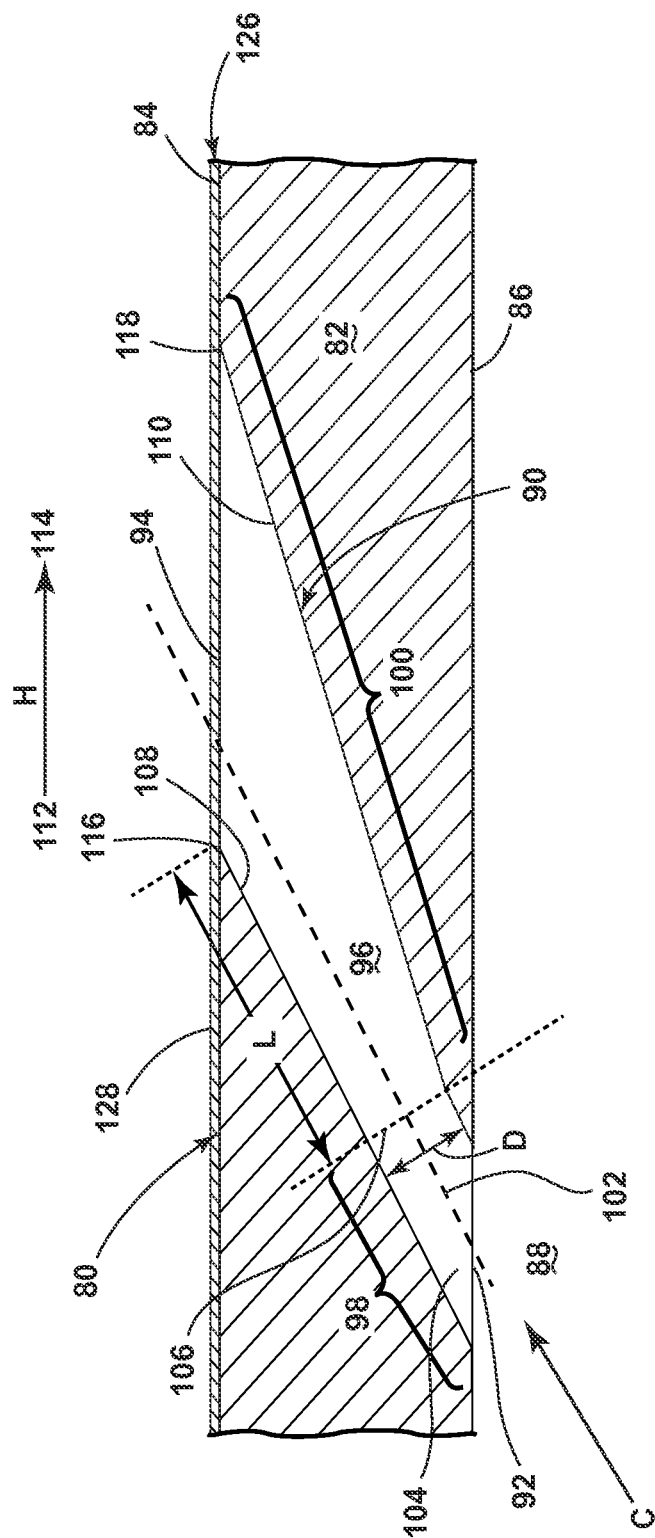
FIG. 5 is a schematic, sectional view through a film hole of an engine component of the engine from FIG. 1 according to a second embodiment of the invention.

FIG. 5 is a schematic, sectional view showing a portion of an engine component 80 according to a second embodiment of the invention. The engine component 80 is substantially similar to the engine component of the first embodiment, and like elements are identified with the same reference numerals. In the second embodiment, a coating 126 is applied to at least a portion of the hot surface 84 of the substrate 82. The coating 126 defines an upper coating surface 128, opposing the hot surface 84. In embodiments of the invention involving coated engine components, the hooded length L may be defined as the distance between the distal end of the metering section 98 and the upper coating surface 128. Some non-limiting examples of coatings 126 include a thermal barrier coating, an oxidation protection coating, or combinations thereof. The coating 126 may include a single-layer coating or a multi-layer coating. It is noted that some coatings may also be applied to the internal surfaces of the film hole 90. In such a case, the metering diameter D and hooded length L may be measured after the coating is applied.

Figure 6:
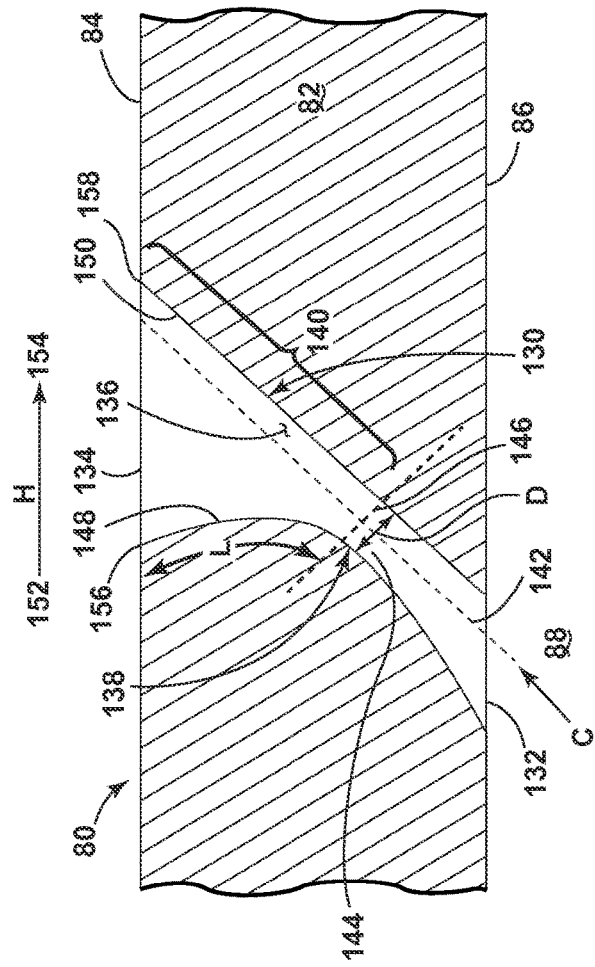
FIG. 6 is a schematic, sectional view through an engine component of the engine from FIG. 1 having a film hole according to a third embodiment of the invention.

FIG. 6 is a schematic, sectional view through the engine component 80 of the engine from FIG. 1 having a film hole 130 according to a third embodiment of the invention. The engine component 80 further includes one or more film hole(s) 130 extending through the substrate 82 that provides fluid communication between the interior cavity 88 and the hot surface 84 of the engine component 80. During operation, the cooling fluid flow C is supplied to the interior cavity 88 and out of the film hole 130 to create a thin layer or film of cool air on the hot surface 84, protecting it from the hot combustion gas flow H. While only one film hole 130 is shown in FIG. 6, it is understood that the engine component 80 may be provided with multiple film holes 130.

The film hole 130 can have an inlet 132 provided on the cooling surface 86 of the substrate 82, an outlet 134 provided on the hot surface 84, and a passage 136 connecting the inlet 132 and the outlet 134. The passage 136 can include a metering section 138 for metering of the mass flow rate of the cooling fluid flow C, and a diffusing section 140 in which the cooling fluid C may expand to form a wider cooling film. The diffusing section 140 is downstream of the metering section 138 with respect to the direction of cooling fluid flow C through the passage 136. The diffusing section 140 may be in serial flow communication with the metering section 138. In operation, the cooling fluid flow C enters the film hole 130 through the inlet 132 and passes through the metering section 138 and diffusing section 140 before exiting the film hole 130 at the outlet 134 along the hot surface 84.

The metering section 138 is a portion of the passage 136 with the smallest cross-sectional area perpendicular to the direction of the cooling fluid flow C through the passage 136. In the illustrated embodiment, the metering section 138 is a discrete location at which the passage has the smallest cross-sectional area, with the cross-sectional area of the metering section 138 defining a metering diameter D of the passage 136.

The cooling fluid flow C through the passage 136 is along the longitudinal axis of the passage 136, also referred to herein as the centerline 142, which passes through the geometric center of the cross-sectional area of the metering section 138. The film hole 130 can be inclined in a downstream direction of the cooling fluid flow C through the passage 136 such that the centerline 142 is non-orthogonal to the hot and cooling surfaces 84, 86.

An inlet 144 to the metering section 138 communicates with the inlet 132 to the passage 136 and receives the cooling fluid flow C therefrom. An outlet of the diffusing section 140 is coincident with the outlet 134 of the passage 136. In some embodiments of the invention, including the embodiment of FIG. 6, the inlet 144 to the metering section 138 may further be downstream of the inlet 132 to the passage 136.

An outlet of the metering section 138 is coincident with an inlet to the diffusing section 140, and the coincident outlet and inlet define a transition 146 between the metering section 138 and the diffusing section 140 where the cooling fluid flow C may begin to expand. In the illustrated embodiment, the metering section 138 is a discrete location of the passage 136, and the transition 146 lies at the metering section 138. The transition 146 is defined by an imaginary line that is perpendicular to the centerline 142 at the metering section 138.

The diffusing section 140 includes a pair of spaced apart boundary surfaces 148, 150. The boundary surfaces 148, 150 can generally be defined relative to the direction of the hot combustion gas flow H, with the hot combustion gas flow H generally defining an upstream direction 152 and a downstream direction 154 relative to the hot surface 84, i.e. past the outlet 134. The upstream boundary surface 148 generally faces the downstream direction 154 and the downstream boundary surface 150 generally faces the upstream direction 152. The upstream boundary surface 148 intersects the hot surface 84 of the substrate 82 at an upstream edge 156 of the outlet 134, and the downstream boundary surface 150 intersects the hot surface 84 of the substrate 82 at a downstream edge 158 of the outlet 134.

In the illustrated embodiment, the upstream boundary surface 148 diverges away from the centerline 142 while the downstream boundary surface 150 is substantially parallel to the centerline 142. Further, in the illustrated embodiment, the upstream boundary surface 148 defines a curved boundary line that curves away from the centerline 142 and the downstream boundary surface 150 defines a linear boundary line.

For this embodiment since the upstream boundary surface 148 defines a curved boundary line, the hooded length L, defined as the distance along the upstream boundary surface 148 between the downstream end of the metering section 138, or the transition 146, and the hot surface 84, will be determined along the curve, rather than being, for example, the shortest linear distance between the transition 146 and the hot surface 84. In the illustrated embodiment, the hooded length L is determined between the transition 146 and the upstream edge 156 along the curved upstream boundary surface 148. The hood ratio L/D may lie in the various ranges discussed above with the respect to the first embodiment, including in relation to the blowing ratio BR.

Figure 7:
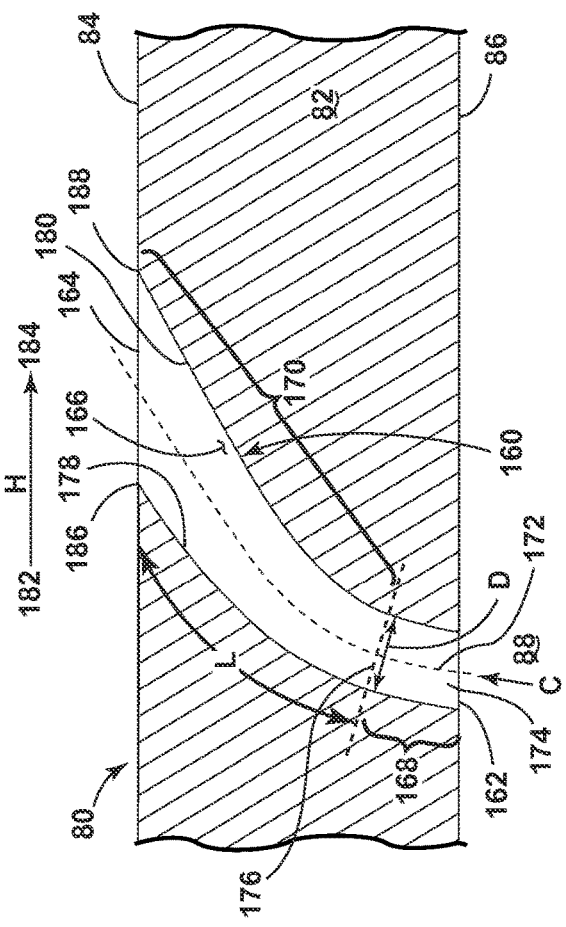
FIG. 7 is a schematic, sectional view through an engine component of the engine from FIG. 1 having a film hole according to a fourth embodiment of the invention.

FIG. 7 is a schematic, sectional view through the engine component 80 of the engine from FIG. 1 having a film hole according to a fourth embodiment of the invention. The engine component 80 further includes one or more film hole(s) 160 extending through the substrate 82 that provide fluid communication between the interior cavity 88 and the hot surface 84 of the engine component 80. During operation, the cooling fluid flow C is supplied to the interior cavity 88 and out of the film hole 160 to create a thin layer or film of cool air on the hot surface 84, protecting it from the hot combustion gas flow H. While only one film hole 160 is shown in FIG. 6, it is understood that the engine component 80 may be provided with multiple film holes 160.

The film hole 160 can have an inlet 162 provided on the cooling surface 86 of the substrate 82, an outlet 164 provided on the hot surface 84, and a passage 166 connecting the inlet 162 and the outlet 164. The passage 166 can include a metering section 168 for metering of the mass flow rate of the cooling fluid flow C, and a diffusing section 170 in which the cooling fluid C may expand to form a wider cooling film. The diffusing section 170 is downstream of the metering section 168 with respect to the direction of cooling fluid flow C through the passage 166. The diffusing section 170 may be in serial flow communication with the metering section 168. The metering section 168 can be provided at or near the inlet 162, while the diffusing section 170 can be defined at or near the outlet 164. In operation, cooling fluid flow C enters the film hole 160 through the inlet 162 and passes through the metering section 168 and diffusing section 170 before exiting the film hole 160 at the outlet 164 along the hot surface 84.

The metering section 168 is a portion of the passage 166 with the smallest cross-sectional area perpendicular to the direction of the cooling fluid flow C through the passage 166. In the illustrated embodiment, the metering section 168 is an elongated section of the passage 166. The cross-sectional area of the metering section 168 defines a metering diameter D of the passage 166.

The cooling fluid flow C through the passage 166 is along the longitudinal axis of the passage 166, also referred to herein as the centerline 172, which passes through the geometric center of the cross-sectional area of the metering section 168. The film hole 160 can be inclined in a downstream direction of cooling fluid flow C through the passage 166 such that the centerline 172 is non-orthogonal to the hot and cooling surfaces 84, 86.

An inlet 174 to the metering section 168 communicates with the inlet 162 to the passage 166 and receives the cooling fluid flow C therefrom. An outlet of the diffusing section 170 is coincident with the outlet 164 of the passage 166. In some embodiments of the invention, including the embodiment of FIG. 7, the inlet 174 to the metering section 168 may further be coincident with the inlet 162 to the passage 166.

An outlet of the metering section 168 is coincident with an inlet to the diffusing section 170, and the coincident outlet and inlet define a transition 176 between the metering section 168 and the diffusing section 170 where the cooling fluid flow C may begin to expand. In the illustrated embodiment, the metering section 168 is an elongated section of the passage 166, and the transition 176 lies at a distal or downstream end of the metering section 168. The transition 176 is defined by an imaginary line that is perpendicular to the centerline 172 at the outlet or downstream end of the metering section 168.

The diffusing section 170 includes a pair of spaced apart boundary surfaces 178, 180. The boundary surfaces 178, 180 can generally be defined relative to the direction of the hot combustion gas flow H, with the hot combustion gas flow H generally defining an upstream direction 182 and a downstream direction 184 relative to the hot surface 84, i.e. past the outlet 164. The upstream boundary surface 178 generally faces the downstream direction 184 and the downstream boundary surface 180 generally faces the upstream direction 182. The upstream boundary surface 178 intersects the hot surface 84 of the substrate 82 at an upstream edge 186 of the outlet 164, and the downstream boundary surface 180 intersects the hot surface 84 of the substrate 82 at a downstream edge 188 of the outlet 164.

In the illustrated embodiment, the upstream and downstream boundary surfaces 178, 180 diverge away from the centerline 172. Further, in the illustrated embodiment, the upstream and downstream boundary surfaces 178, 180 define curved boundary lines.

For this embodiment since the upstream boundary surface 178 defines a curved boundary line, the hooded length L, defined as the distance along the upstream boundary surface 178 between the downstream end of the metering section 168, or the transition 176, and the hot surface 84, will be determined along the curve, rather than being, for example, the shortest linear distance between the transition 176 and the hot surface 84. In the illustrated embodiment, the hooded length L is determined between the transition 176 and the upstream edge 186 along the curved upstream boundary surface 178. The hood ratio L/D may lie in the various ranges discussed above with the respect to the first embodiment, including in relation to the blowing ratio BR.

In any of the above embodiments, the present invention may be combined with shaping or contouring of the metering section and/or diffusing section of the film hole 90. Embodiments of the present invention may also apply to slot-type film cooling, in which case the outlet 94 is provided within a slot on the hot surface 84.

Further, in any of the above embodiments, a coating can be applied to the hot surface 84 of the substrate 82. Some non-limiting examples of coatings include a thermal barrier coating, an oxidation protection coating, or combinations thereof.

Further, in any of the above embodiments, although the substrate 82 is shown as being generally planar, it is understood that that the substrate 82 may be curved for many engine components 80. However, the curvature of the substrate 82 may be slight in comparison to the size of the film hole, and so for the purposes of discussion and illustration, the substrate 82 is shown as planar.

The various embodiments of devices and methods related to the invention disclosed herein provide improved cooling for engine structures, particularly in a turbine component having film holes. One advantage that may be realized in the practice of some embodiments of the described systems is that a film hole is provided with a hooded length L that allows the cooling fluid flow C to diffuse before being exposed to the hot combustion gas flow H. The hooded length L can be related to the metering diameter D of the film hole such that the hooded ratio L/D falls within a predetermined range for film cooling effectively. Another advantage that may be realized in the practice of some embodiments of the described devices is that the hood ratio L/D may further be determined based on the blowing ratio BR for the film hole.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component for a gas turbine engine, the gas turbine engine generating hot combustion gas flow, comprising:
   a substrate having a hot surface facing the hot combustion gas flow and a cooling surface facing a cooling fluid flow, the hot combustion gas flow defining an upstream direction and a downstream direction relative to the hot surface; and
   a film hole extending through the substrate and defining a centerline, and comprising:
      a metering section defining a metering diameter D and extending between an inlet of the metering section and an outlet of the metering section corresponding to a downstream end of the metering section where the centerline passes through a geometric center of the metering section; and
      a diffusing section extending between an inlet of the diffusing section and an outlet of the diffusing section where the inlet of the diffusing section is coincident with the outlet of the metering section to define a transition and having a downstream boundary surface and an upstream boundary surface;
   wherein the transition marks the downstream end of the metering section where a diameter of the film hole begins to increase and the diffusing section defines a hooded length L as the distance along the upstream boundary surface between the transition and the hot surface; and
   wherein $2 \leq L/D \leq 6$, with the L/D having a value within a corresponding blowing ratio range associated with the film hole.

2. The engine component of claim 1, wherein $2 \leq L/D \leq 3$.

3. The engine component of claim 1, wherein the diffusing section defines an outlet of the film hole at the hot surface.

4. The engine component of claim 3, wherein the metering section defines an inlet of the film hole at the cooling surface.

5. The engine component of claim 3, wherein the downstream boundary surface intersects the hot surface at a downstream edge of the outlet and the upstream boundary surface intersects the hot surface at an upstream edge of the outlet and the hooded length L is the distance between the downstream end of the metering section and the upstream edge along the upstream boundary surface.

6. The engine component of claim 1, wherein the upstream boundary surface is parallel to the centerline.

7. The engine component of claim 6, wherein the downstream boundary surface diverges away from the centerline.

8. The engine component of claim 1, wherein the upstream boundary surface diverges away from the centerline.

9. The engine component of claim 1, wherein the upstream boundary surface is planar relative to the centerline.

10. The engine component of claim 1, wherein the upstream boundary surface is linear in an axial direction along the centerline.

11. The engine component of claim 1, wherein the metering diameter D is constant along the metering section.

12. The engine component of claim 11, wherein the metering section is cylindrical.

13. The engine component of claim 1, wherein the centerline is inclined in the downstream direction such that the centerline is non-orthogonal to the cooling surface and the hot surface.

14. The engine component of claim 1 and further comprising a coating on the hot surface defining an upper coating surface, wherein the hooded length L is the distance between the downstream end of the metering section and the upper coating surface.

15. The engine component of claim 1, wherein the engine component comprises one of a blade, a vane, a shroud, a combustor deflector, or a combustor liner.

16. The engine component of claim 1 wherein the substrate comprises an exterior wall of the engine component, the exterior wall of the engine component forming an interior of the engine component to which the cooling fluid flow is supplied.

17. The engine component of claim 1 wherein L/D is equal to the corresponding blowing ratio of the film hole.

18. An engine component for a gas turbine engine, the gas turbine engine generating hot combustion gas flow, comprising:
   a substrate having a hot surface facing the hot combustion gas flow and a cooling surface facing a cooling fluid flow, the hot combustion gas flow defining an upstream direction and a downstream direction relative to the hot surface; and
   a film hole extending through the substrate and defining a centerline, and comprising:
      a metering section having an inlet of the metering section provided on the cooling surface defining a metering diameter D and extending to an outlet of the metering section corresponding to a downstream end of the metering section where the centerline passes through a geometric center of the metering section; and
      a diffusing section extending between an inlet of the diffusing section and an outlet of the diffusing section where the inlet of the diffusing section is coincident with the outlet of the metering section to define a transition and having a downstream boundary surface, upstream boundary surface, and the outlet of the diffusing section provided on the hot surface;
   wherein the transition marks the downstream end of the metering section where a diameter of the film hole begins to increase and the diffusing section defines a hooded length L as the distance along the upstream boundary surface between the transition and the outlet provided on the hot surface; and
   wherein the ratio of the hooded length L to the metering diameter D is approximately equal to a blowing ratio of the film hole and is $2 \leq L/D \leq 6$.

19. The engine component of claim 18, wherein $2 < L/D < 6$.

20. The engine component of claim 19, wherein $2 < L/D < 4$.

* * * * *